Jan. 8, 1935.                K. MOERS                1,987,576

METHOD OF APPLYING COATINGS ON METALS

Filed Oct. 21, 1930

Inventor:
Kurt Moers,
by Charles V. Tulla
His Attorney.

Patented Jan. 8, 1935

1,987,576

UNITED STATES PATENT OFFICE 1,987,576

METHOD OF APPLYING COATINGS ON METALS

Kurt Moers, Charlottenburg, Germany, assignor to General Electric Company, a corporation of New York Application October 21, 1930, Serial No. 490,321
In Germany April 15, 1930

3 Claims. (Cl. 91—70.1)

The present invention relates to a method of applying coatings on metals. More specifically this invention is concerned with an improved method of applying coatings on electrical conductors.

It has been suggested to apply coatings on electrically conducting wires, filaments, or the like by separating the coating material from a vaporized chemical compound. Usually vaporized halide compounds of metals or other elements are employed, which compounds are dissociated at the surface of intensely heated wires, filaments, or the like, in the presence of, or without the use of an inert or reducing gas, while the metal or a compound thereof is deposited on the heated wire in a uniform layer. The technical procedure in such a method where either stationary or continuously advanced wires, filaments, or the like are acted upon, is to heat the latter within a reaction container between two current supply contacts until a temperature necessary for the dissociation of the vaporized chemical compound is reached. The chemical compound is supplied to the container either in the vaporized state or it is caused to assume the vaporized state in the reaction container or in an addition thereto, by heating the chemical compound by means of an external source of heat. In the latter case, the reaction container must be made of a suitable material such as hard glass or quartz if the compounds are high melting ones.

The purpose of the invention is to simplify the method of production of such coatings avoiding the external heating and hence the necessary use of hard glass or quartz containers, at the same time employing a minimum amount of the chemical compound which is to be dissociated.

According to the invention, the chemical compound which is to be dissociated is for this purpose supplied to the reaction container in solid or liquid form. It is supplied in such a way that it is in close proximity to the wire, filament, or the like which is heated by the electric current so that the heat is utilized in a novel way simultaneously for the evaporation of the chemical compound, for the dissociation thereof, and for the precipitation of the coating on the metal being coated. An especially economic consumption of the chemical compound results if the heated metal which is to be provided with the coating is positioned in a relatively small opening or confined space within a compressed mass or body of the chemical compound to be dissociated and if at the same time the wire, filament, or the like is led continuously through the opening. The opening must be of a size such that the heat from the intensely heated and usually glowing wire, filament, or the like, suffices for the evaporation of the chemical compound which forms the pressed mass or body. A vapor of a high concentration is thus formed in the narrow opening of the pressed mass, the desired coating metal (for instance, platinum, tungsten, uranium, vanadium, rhenium, tantalum) or coating metalloid (for instance, silicon, boron, carbon) or coating compound (for instance, zirconium carbide, titanium nitride, chromium oxide, hafnium phosphide, uranium sulphide) being precipitated on the glowing wire or the like in a coherent and uniform layer. It is evident that it is also possible to precipitate several of the mentioned coating materials simultaneously or successively on the wire or the like. In the production of a coating compound a washing gas may be circulated through the apparatus, and as is known, the chemical compound to be dissociated or the washing gas should have a suitable agent added thereto, e. g., hydrocarbon, nitrogen, phosphorous, sulphur, etc. For instance, when making a coating of zirconium carbide, using a pressed body of zirconium tetrachloride, a certain amount of methane must be added to the washing gas or the washing gas must be passed through a washing apparatus containing a liquid hydrocarbon such, for example, as benzol or toluol. There takes place on the glowing filament, simultaneously a decomposition of the zirconium tetrachloride and of the methane, and a transformation to zirconium carbide in the stable, solid phase. In order to obtain a deposit of hafnium boride, the washing gas is caused to pass through a washing apparatus containing boron tribromide, a pressed body of hafnium chloride being used. Hafnium boride will then be deposited on the glowing filament with the formation of hydrogen chloride and hydrogen bromide which then escape.

Ordinary glass, metal, or any other material may be used for the reaction container as the latter is only slightly heated during operation. In most cases, a simple glass cylinder provided with an inlet and an outlet for the inert or reducing washing gas, as well as an opening for the wire or the like, which is to be coated and the necessary contacts, is sufficient.

Several devices suitable for the method are schematically shown on the drawing in Figs. 1 to 4.

Figure 1:
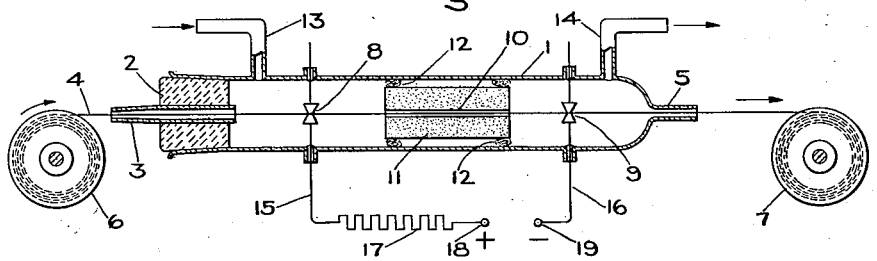
Fig. 1 is a view partly in elevation and partly in section of one embodiment of the invention.

A horizontally located glass cylinder 1 is used in the device shown in Fig. 1; this glass cylinder which is used as a reaction chamber is closed at one end by a plug or stopper 2 through which a small tube 3 passes which permits the introduction into the container of the metal to be coated, such as wire 4. At the end opposite to that in which the plug 2 is located, cylinder 1 is provided with a tube 5 through which the wire 4 passes. The wire is continuously reeled from a roll 6 and onto a roll 7. The wire 4 is led within the reaction chamber or the glass cylinder 1 through two pairs of contacts 8, 9 and also through a relatively small or narrow opening 10 in a compressed mass or body 11 which is arranged between the pairs of contacts and which comprises the chemical compound which is to be dissociated. The body 11 is kept in position within the glass cylinder 1 by suitable means 12, made of a material which is not attacked by the vapors generated, as for instance, asbestos or glass wool. However, it is also possible to keep the pressed body 11 in its axial position within the glass cylinder 1 by means of projections in the glass cylinder or metallic spreading rings or in any other suitable manner. A constant flow of inert or reducing washing gas is maintained through the tubes 13, 14 and the inside of the glass cylinder 1 as indicated in the drawing. The contacts 8, 9 are connected to the terminals 18, 19 of a source of current by means of conductors 15, 16 through a resistance 17. While the resistance 17 has been shown as fixed, it is of course obvious that a variable resistance may be employed to permit variation of the resistance where necessary. When the current is supplied, that part of the wire 4 which is located between the contacts 8, 9 is intensely heated or made to glow. The compound at the surface of the pressed body adjacent to the heated wire is thereby changed into the vapor state. The vapor fills the opening 10, reaches a very high concentration, is dissociated at the surface of the heated wire 4, and the coating material is precipitated on the wire. The high rate of concentration within the opening of the pressed body causes the wire to be uniformly coated very rapidly. The formation of the coating is so rapid or the deposit is so great that the wire 4 soon after it enters into the opening in the pressed body, due to the increased cross section thereof, reaches a temperature which is no longer sufficient for any large formation of vapor. Frequently, a wire which enters the opening in the pressed body in a highly glowing condition leaves it with a temperature below red heat. Consequently, vapor will only be formed in the first part of the opening in the pressed body which of course results in a very small consumption of the chemical compound used for the dissociation. If the entrance to the opening of the pressed body has been enlarged too much due to evaporation, the coating zone automatically moves in the direction toward the opposite end of the pressed body so that a deposit of uniform thickness is attained at all times.

The device can of course also be used in an upright position instead of a horizontal position in which case the wire 4 which is to be coated preferably has a vertical motion. If only comparatively short pieces of wire are to be provided with a coating, it is possible under certain circumstances to omit the motion of the wire which is passed through the opening in the pressed body so that the wire remains stationary during the precipitation process.

Figure 2:
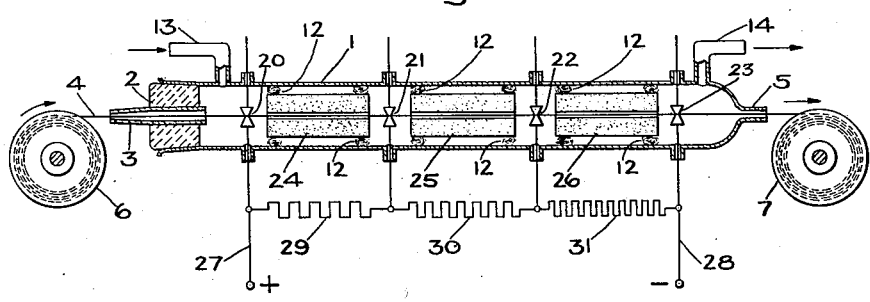
Fig. 2 is a view similar to Fig. 1 and illustrates another embodiment of the invention.

In the device, according to Fig. 2, four pairs of contacts 20, 21, 22, 23, and three pressed bodies 24, 25, 26, are arranged axially within the glass cylinder 1, which is used as the reaction chamber in such a way that each pressed body is located between two pairs of contacts. All the contacts are connected in series to two common current supply wires 27, 28. The resistances 29, 30, 31, are connected in parallel to the parts of the wire that are to be covered which are located between the pairs of contacts. As the parts of the wire located within the pressed bodies 24, 25, 26, have an increasing cross section, the resistances 29, 30, 31, are also of different sizes in such a way that the wire at the entrance in each of the pressed bodies 24, 25, 26, attains the same reaction temperature. Consequently, a formation of vapor as well as a precipitation takes place in each of the pressed bodies. It is of course obvious that the resistances 29, 30, 31 may be variable in character to permit of adjustment where necessary.

Figure 3:
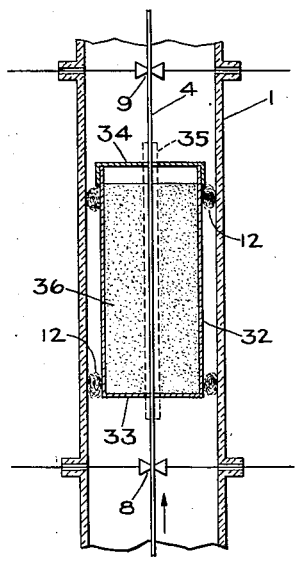
Fig. 3 is a fragmentary cross sectional view of still another embodiment of the invention.

If it is very difficult to compress the chemical compound, which is to be dissociated, to the shape of a handy pressed body, or if the chemical compound is not sufficiently stable in air, it is possible, as shown in Fig. 3, to enclose the pulverized chemical compound in a container 32 of metal or some other similar material. The container 32 is supported axially in the glass cylinder 1 in a manner similar to that shown in Figs. 1 and 2. The metal container 32 has an axially drilled hole both in the bottom part 33 as well as in the removable cover 34 through which hole a bar 35 is pushed as indicated by the dotted lines before the pulverized chemical compound is supplied. When the cover 34 is removed, the powder 36 is pressed between the container wall and the bar 35, after which the bar 35 is removed. After the cover has been replaced, the wire 4 which is to be coated is pulled through the opening which is formed in the mass of powder 36 which is pressed together. The wire may pass through the hole horizontally or, as shown, vertically.

Figure 4:
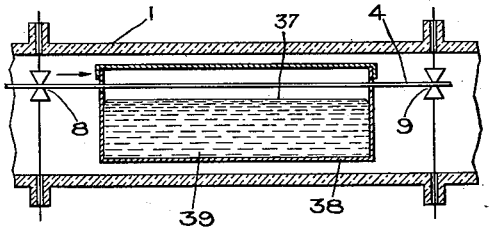
Fig. 4 is a view similar to Fig. 3 disclosing a still further embodiment of the invention.

It is not absolutely necessary to lead the wire that is to be covered through a chemical compound in the solid state. Under certain circumstances, it suffices to let the wire 4, which is to be covered, pass closely above the surface 37 of a liquid or pulverized chemical compound 39 which is within a container 38. This is shown in Fig. 4. The container 38 can be held in the reaction chamber 1 in any desired manner. The electric current supplied to the wire 4 that is to be heated, in this case also serves for the formation of vapor and for the precipitation of the coating material.

The separation of coating material from the compound employed can also be accomplished without the use of a washing gas by employing a partial vacuum. In such case, it is advantageous to use mercury contacts for the inlet and the outlet for the wire that is to be covered. These mercury contacts may be provided in the wall of the reaction container and insure a positive air-tight seal.

What I claim as new and desire to secure by Letters Patent of the United States is:

1. A method for coating a metallic wire or the like which comprises passing the wire through a relatively small opening within a body of a chemical compound supported in a container which compound is dissociated by heat to form the coating material, and heating said wire, while it is passed through said opening, to a temperature sufficiently high to dissociate said compound and to coat on said wire without applying heat to the outside of said container.

2. A method for coating a metallic wire or the like which comprises passing said wire through relatively narrow openings in a series of spaced bodies of vaporizable chemical compounds located within a container and heating the portions of the wire only as they pass through the openings in said bodies, to a temperature sufficiently high to effect a coating on said wire without applying heat to the outside of said container.

3. A method for coating an electrically conducting wire or the like with a chemical compound which consists in passing said wire through a relatively narrow opening in a vaporizable body located in a container through which an inert or reducing gas is circulated, adding to said gas a suitable agent which is adapted to react with said body to form said chemical compound, and supplying heat to effect a coating of said chemical compound on said wire by electrically heating said wire.

KURT MOERS.